United States Patent [19]

Trickel et al.

[11] 4,440,208

[45] Apr. 3, 1984

[54] COMPOSITE, SOLID, VEHICLE TIRE

[75] Inventors: Lorn L. Trickel; William H. Stultz, both of Portland, Oreg.

[73] Assignee: OMNI Rubber Products, Inc. Portland, Oreg.

[21] Appl. No.: 371,713

[22] Filed: Apr. 26, 1982

Related U.S. Application Data

[63] Continuation of Ser. No. 188,295, Sep. 18, 1980, abandoned, and a continuation-in-part of Ser. No. 141,067, Apr. 17, 1980, abandoned.

[51] Int. Cl.$^3$ ............................................... B60C 7/00
[52] U.S. Cl. ..................................... 152/314; 152/316; 264/37; 264/DIG. 69
[58] Field of Search ...................... 152/316, 314, 312; 428/327, 492, 493, 65, 68, 76, 542.8; 264/37, 126, DIG. 69

[56] References Cited

U.S. PATENT DOCUMENTS

| | | | |
|---|---|---|---|
| 92,764 | 7/1869 | Tuttle | 260/720 |
| 1,031,469 | 7/1912 | Roberts | 152/316 |
| 1,049,039 | 12/1912 | Beasley | 152/311 X |
| 1,097,824 | 5/1914 | Staten | 152/318 |
| 1,193,196 | 8/1916 | Sherbondy | 152/313 X |
| 1,897,626 | 2/1933 | Voss | 264/330 X |
| 1,985,187 | 12/1934 | Miller | 152/316 |
| 3,318,756 | 5/1967 | Pollock | 428/114 |

Primary Examiner—William A. Powell
Assistant Examiner—Thomas Bokan
Attorney, Agent, or Firm—Eugene D. Farley

[57] ABSTRACT

A consolidated, rubber article such as a filler segment for composite solid rubber tires is made by reducing solid rubber articles to small pieces, placing the pieces in a mold having the configuration of the desired tire filler segment, and heating the pieces in the mold while applying pressure thereto.

The mold assembly includes a filling chamber and a releasably attachable mold body. A press block fits slidably in the filling chamber and is operable to compress the rubber pieces into the mold. The press block then is locked to the mold body to close the mold, whereby the mold body and press block may be separated from the filling chamber while maintaining the closure. The pieces in the mold body are then heated, while compressed, sufficiently to consolidate the mold contents into a tire filler segment having a density of from 15 to 75 pounds per cubic foot. The consolidated product is then cooled and removed from the mold.

The vehicle tire product comprises a tire casing and within the casing a filler comprising abutting segments made from the molded and consolidated rubber pieces aforesaid.

1 Claim, 13 Drawing Figures

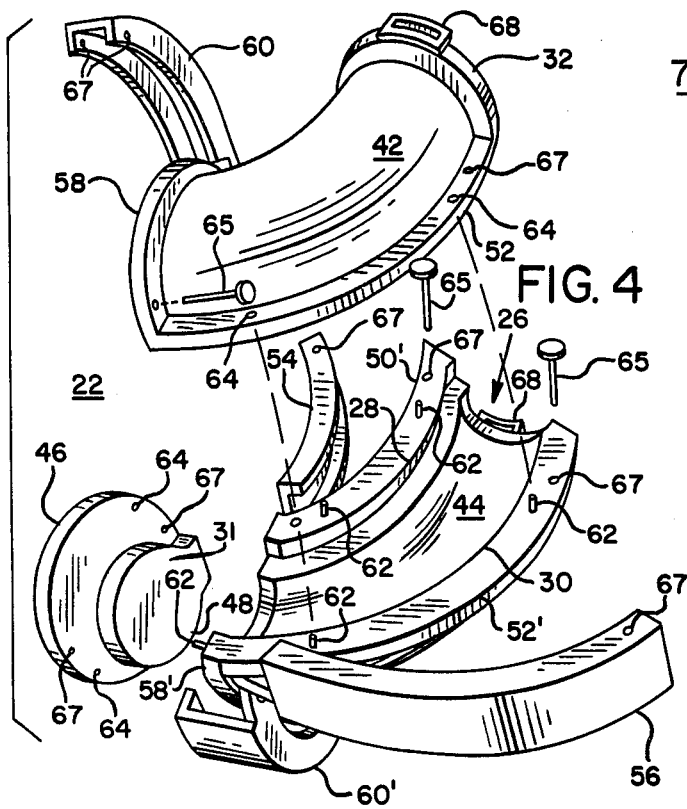
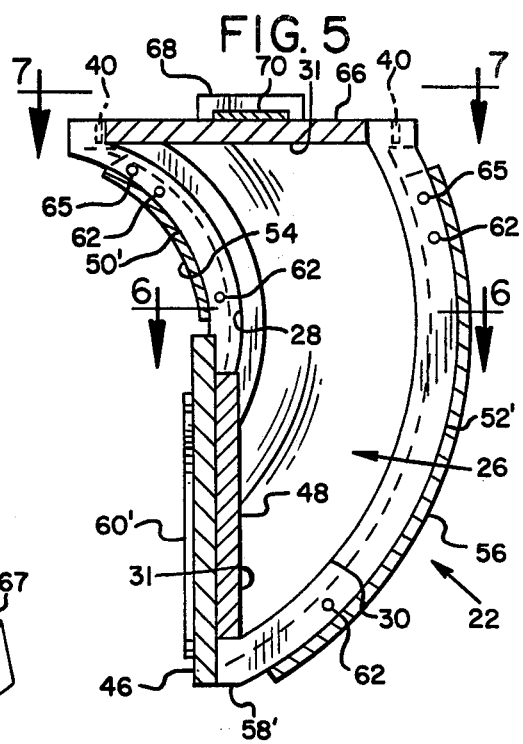
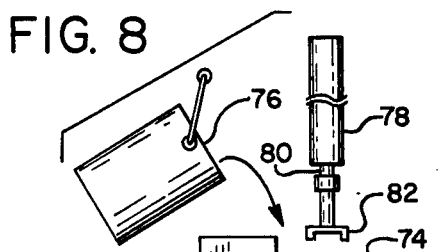
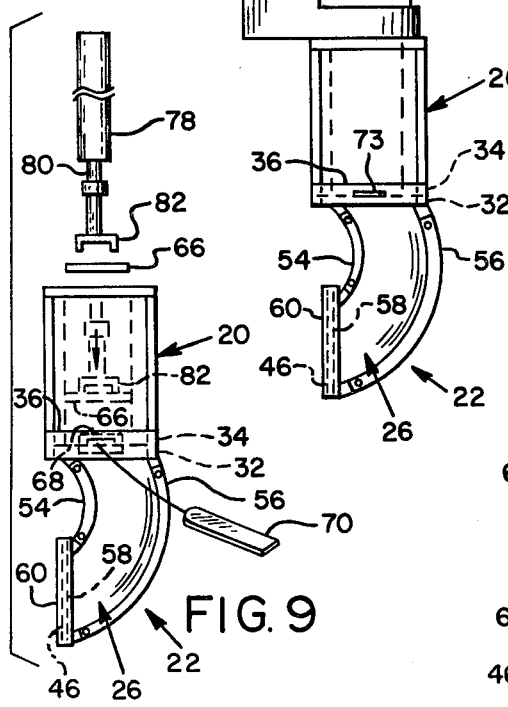
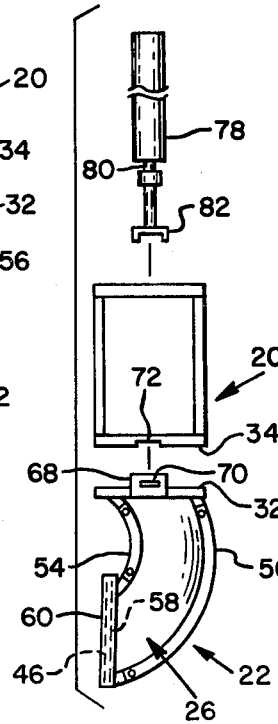
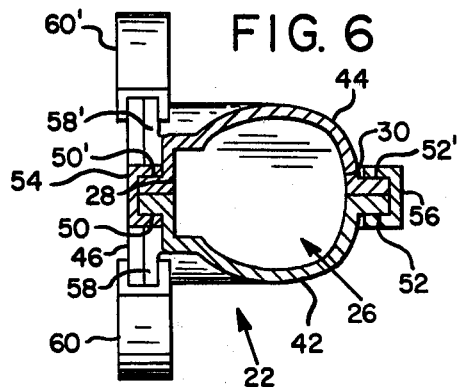
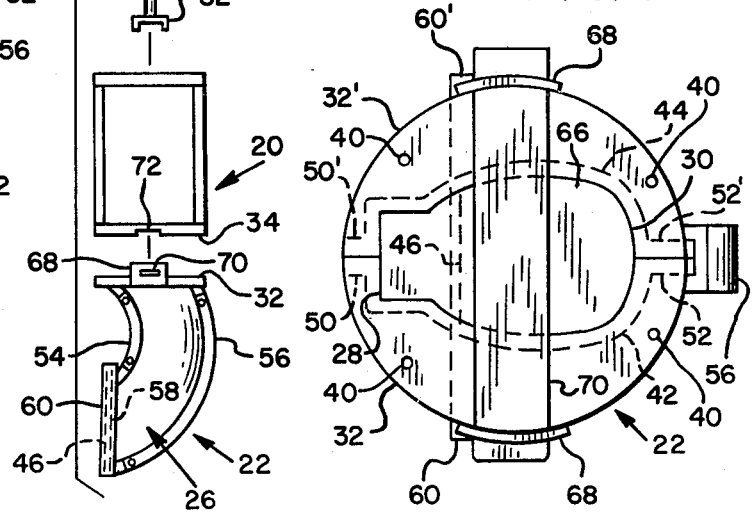

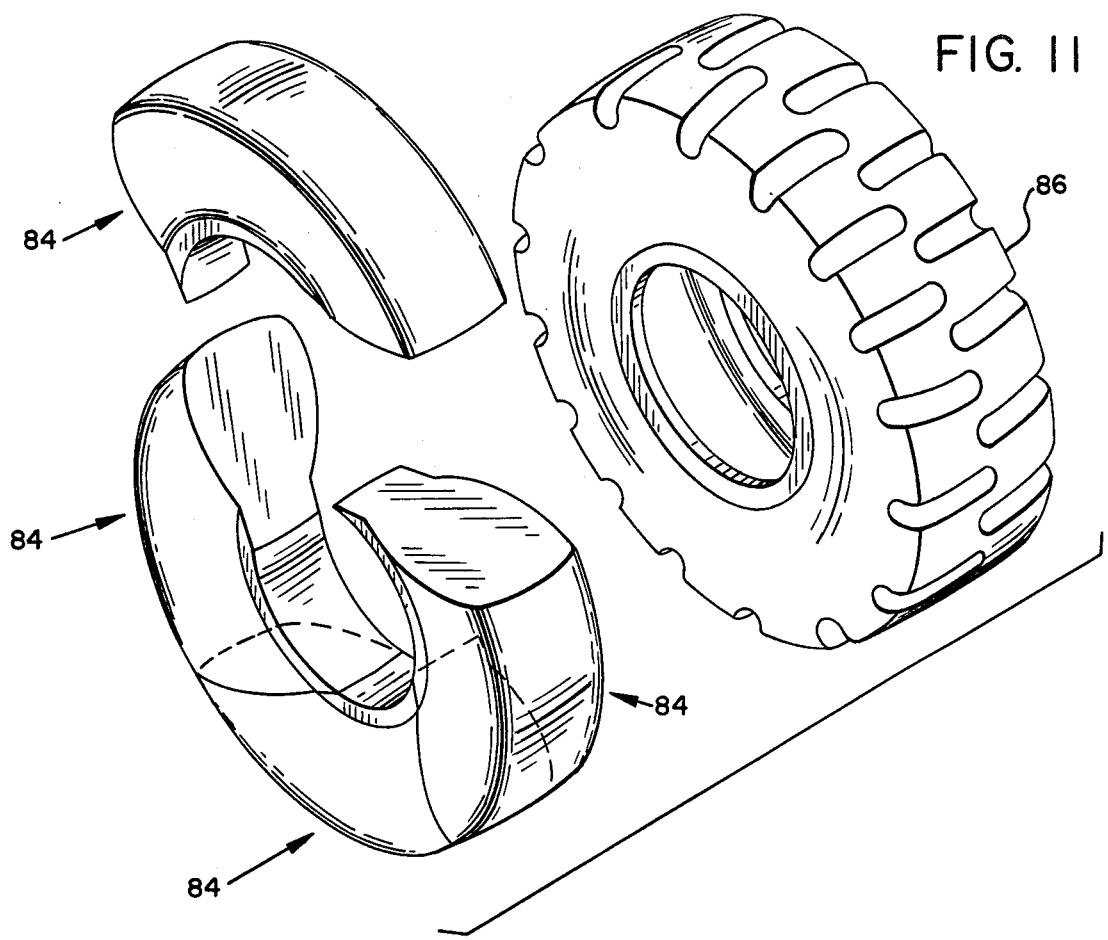
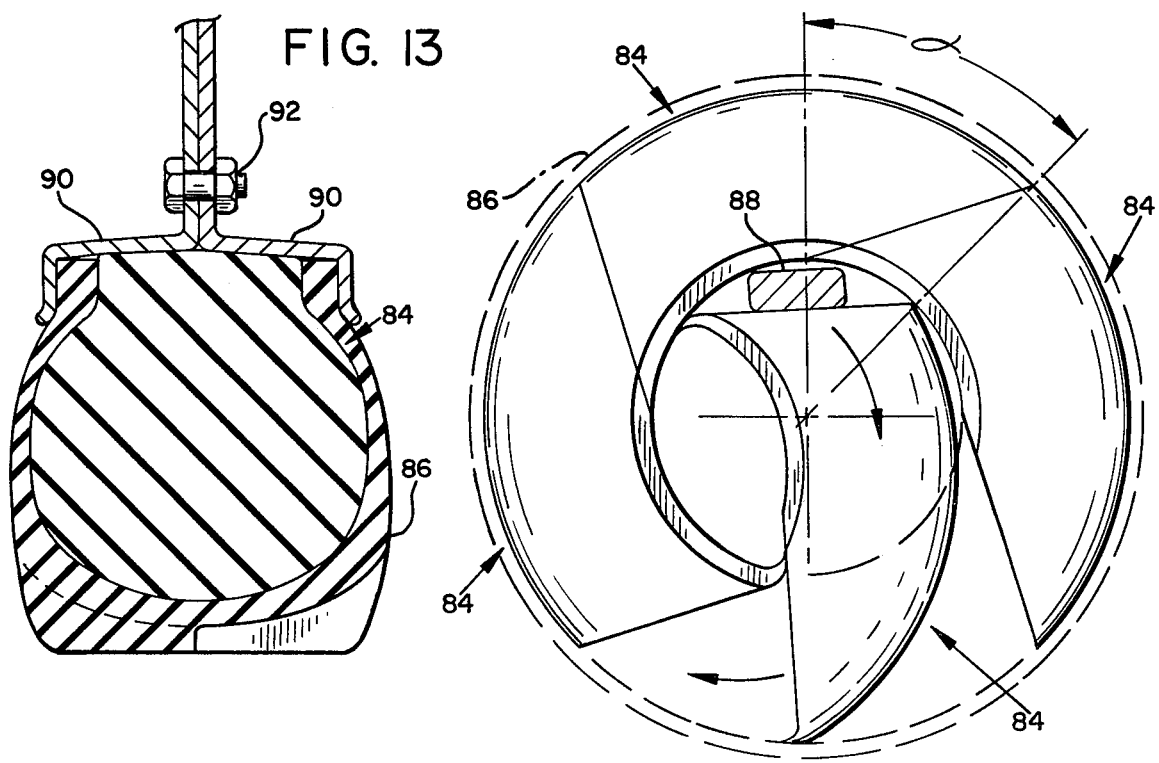

COMPOSITE, SOLID, VEHICLE TIRE

This application is a continuation of application Ser. No. 188,295, filed Sept. 18, 1980, now abandoned, and a continuation-in-part of U.S. application Ser. No. 141,067, filed Apr. 17, 1980 abandoned.

BACKGROUND OF THE INVENTION

This invention pertains to articles consolidated from rubber pieces and particularly to composite solid tires for vehicles, and to a mold and method of making a consolidated filler segment therefor.

Conventional pneumatic tires are filled with air to the pressure required to maintain their configuration and resiliency as they support the weight of a vehicle. However, pneumatic tires are not suitable for use in some industrial applications since they are subject to puncturing and damage from rough use and the necessity of supporting heavy loads.

For such industrial applications various kinds of tires, including solid tires have been proposed. For example: U.S. Pat. Nos. 1,097,824 and 1,369,626. These tires have been made by consolidating a quantity of rubber into the shape of a solid rubber ring, and inserting the rubber ring into a tire casing. Such products have been hard to make, almost impossible to insert inside the casing, and of relatively short service life.

If the rings are made in segments and the segments inserted into the casing to form a jointed core, as also is shown in the prior art, the segments are prone to become dislodged during use of the tire. As a result, insofar as we are aware, there is no composite tire marketed today of the class under consideration.

Tires having a porous solid fill, such as polyurethane foam, are also shown in the prior art. For example: U.S. Pat. No. Re. 29,890. Usually such fills are introduced as a liquid into the tire through the valve stem. They are often too soft for the heavy weight of an industrial vehicle carrying a load. Further, they are costly, tend to wear easily, and are not reuseable if the tire casing becomes damaged or worn out.

There is a need for a solid tire product, however, particularly under heavy duty industrial conditions such as are met by lift truck tires, mobile irrigation sprinkler tires, certain truck tires, etc.

The need for such a tire exists particularly in order to provide a large scale commercial outlet for scrap rubber products, thereby conserving the petroleum resource from which the rubber for present day tires is produced, and also provide a serviceable, low cost, tire product.

It is the general object of the present invention to provide an article consolidated from rubber pieces such as a composite solid tire.

It is a further object of this invention to provide a method of making from scrap rubber pieces consolidated rubber tire filler segments suitable for use in such composite tires.

It is another object of the present invention to provide a mold assembly suitable for forming such tire filler segments.

Another object is to provide a mold assembly having a structure such that the mold may be charged and then sealed while it undergoes heat treatment.

A further object is to provide a sectional mold providing easy access to the molded product.

These and other objects and advantages of the present invention will become apparent in the following specification and claims.

SUMMARY OF THE INVENTION

In its basic concept, the assembly for forming consolidated rubber articles such as composite tire filler segments of the present invention includes a filling chamber and a mold body attachable thereto. In the mold body there is a cavity communicating through an opening with the interior of the filling chamber when the mold body is attached thereto.

A press block fits slidably in the chamber and is operable to apply pressure to the material filling the cavity and chamber. Locking means is engageable with the mold body and press block to fix the press block in the opening, thereby closing the mold. The mold body is then removable from the filling chamber while maintaining the closure.

The presently described method of making articles such as tire filler segments comprises reducing scrap rubber articles to the form of small pieces, compressing the pieces into the mold, and heating the compressed pieces in the mold at a temperature of from 100° to 600° F. while applying a pressure of from 500 to 4,000 psi preferably for a time sufficient to bring the central portion of the mold contents to a temperature of from 200° to 300° F. The mold contents are consolidated to a density of from 15 to 75 pounds per cubic foot, after which the mold and its contents are cooled. The consolidated mixture is then removed from the mold and applied to its intended use.

The herein described vehicle tire product comprises a tire casing, and within the casing a filler comprising abutting segments resulting from the above described procedure.

BRIEF DESCRIPTION OF THE DRAWINGS

FIG. 4 is an exploded side perspective view of the mold body.

FIG. 5 is a vertical section of the mold body taken along the line 5—5 of FIG. 3.

FIG. 6 is a horizontal section taken along the line 6—6 of FIG. 5.

FIG. 7 is a top plan view of the mold body looking in the direction of line 7—7 of FIG. 5.

FIGS. 8–10 are diagrammatic side views of the mold assembly showing sequential stages of the molding process.

FIG. 11 is a partially exploded top perspective view of the composite vehicle tire of our invention.

FIG. 12 is a side elevation of our composite vehicle tire illustrating the insertion of the filler segments.

FIG. 13 is a fragmentary diametrical section of the assembled composite vehicle tire.

DESCRIPTION OF THE PREFERRED EMBODIMENT

Figures 1, 2, 3:
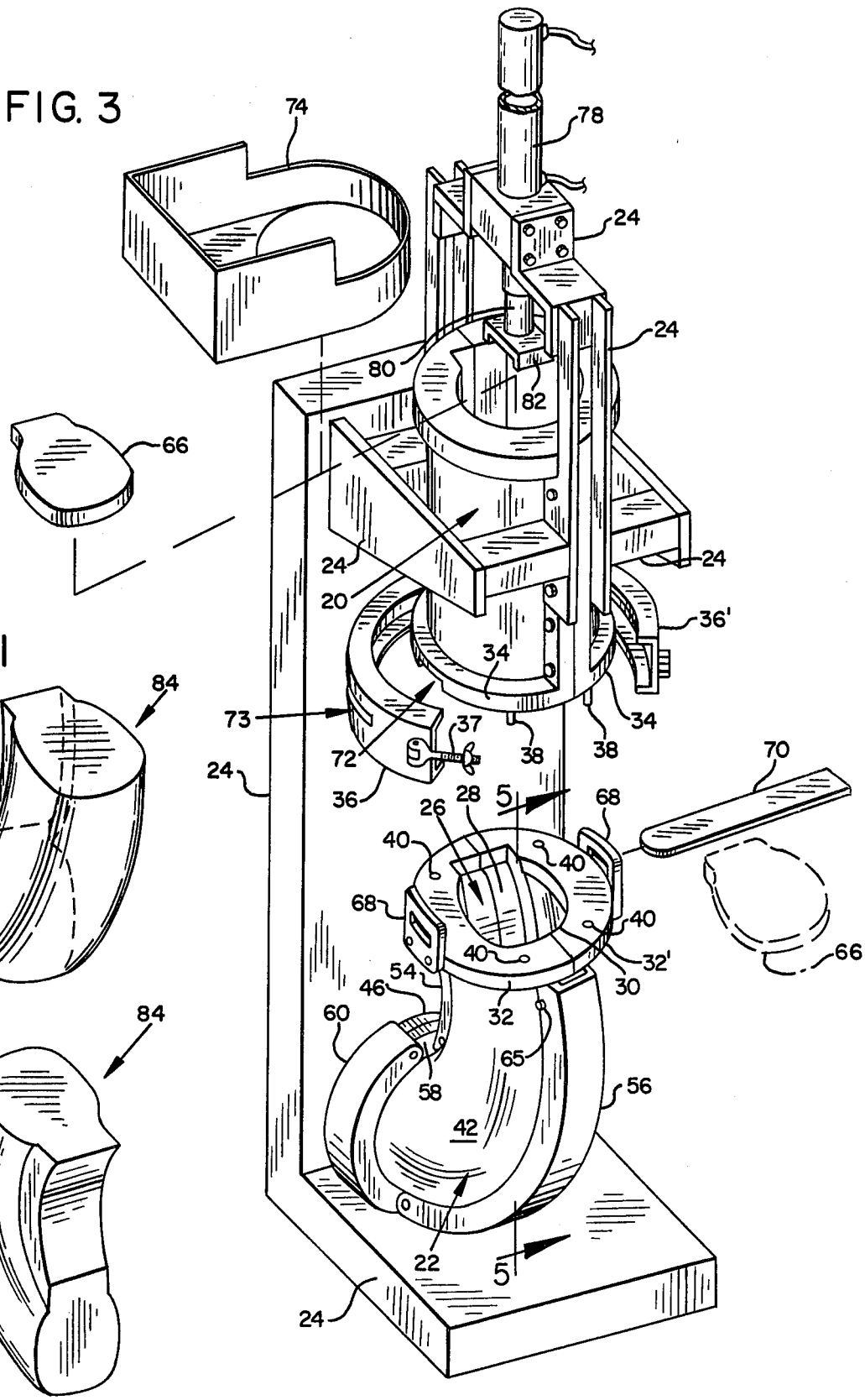
FIG. 1 is a top perspective view of a solid tire filler segment of our invention viewed from the outside.
FIG. 2 is a top perspective view of the tire filler segment of FIG. 1, viewed from the inside.
FIG. 3 is a top perspective view of a mold assembly of our invention, used in the production of the segments of FIGS. 1 and 2.

As stated above, raw material for our invention preferably comprises scrap rubber articles reduced to the form of small pieces. Such scrap rubber articles may comprise vehicle tires, tire tubes, shoe soles, rollers, rubber mats, etc. They preferably comprise scrap rubber tire casings, including the bead and fabric, available in substantially unlimited quantity at very low cost.

Another primary source of raw material for our new tire product comprises the waste rubber byproduct from the tire retreading industry. In this industry it is conventional to buff off with grinding wheels the tread and under tread rubber from the tires to be recapped. This produces annually an enormous quantity of rubber particles ranging in size from dust to about ¼". This waste byproduct poses a very real disposal problem to retread houses. However, it is ideal for use in the composite solid rubber tire products of our invention.

Various combinations of these raw materials may be used. Preferably the material is prepared in two principal categories.

In the first, the scrap rubber articles are reduced severely to the form of very small pieces ranging in size from dust to particles having a maximum screen size of about ¼" mesh.

The other category comprises a quantity of larger pieces such as may be manufactured by chipping the scrap rubber articles to the form of chips having a maximum size of approximately 3" ×3".

The first named category may readily be obtained as a byproduct of the tire recapping industry, as outlined above. The second category may be produced inexpensively by chipping scrap automobile tires, including the whole casing with bead.

The fabric content and wire content of the resulting chips do not interfere with the successful application of the material to our purposes and may even improve the properties of the resulting product.

The consolidated tire segments may comprise consolidated rubber pieces totally of the first category. However, they also may comprise a mixture of small pieces of the first category and up to 75% by weight of the chips of the second category, thus providing an inexpensive raw material.

As is clear from the foregoing discussion, scrap rubber tires are intended as a primary source of raw material for the practice of our invention. The chemical identity of the rubber suitable therefor accordingly is determined by the identity of the rubbers used in the tires. Such rubbers are:

isoprene-type rubber
neoprene-type rubber
butadiene-type rubbers
Buna N
Buna L
Buna GRS These materials may be used in admixture with each other and in admixture with a proportion of natural rubber, although the extensive use of natural rubber is discouraged by its high cost.

It is a feature of the invention that using the present day synthetic rubbers the scrap particles may be consolidated and welded together under the influence of heat and pressure without the necessity of using a bonding agent and/or vulcanizing agent. This is in counterdistinction to the rubber mixtures described in the prior art. It is an important consideration, since elimination of bonding and vulcanizing agents substantially simplifies the processing procedures and reduces the cost of the product.

Our mold assembly, used for forming composite rubber products and shown generally in FIG. 3, comprises a filling chamber 20, and a mold body shown generally at 22. A frame 24 supports the filling chamber which in turn releasably supports the mold body.

Mold body 22 has a cavity therein as shown best at 26 in FIGS. 3, 4 and 5. Preferably the cavity is arcuate, having an inner circumference 28 and an outer circumference 30. The width of the cavity varies radially. A pair of end faces 31 of the cavity are preferably planar, but are not perpendicular to the arcuate contour. Rather they are substantially tangent to inner circumference 28. For an average size tire, it is preferable to have the end faces perpendicular to each other, and it is also preferable to extend each of the end faces through a 45° circumferential angle $\alpha$ as is best shown in FIG. 12.

Mold body 22 has an opening therein, preferably including the entire surface of one of the end faces. The opening is alignable with filling chamber 20, both having substantially the same internal cross section.

Mold body 22 is releasably attachable to the filling chamber 20. Preferably this is accomplished by the provision of a pair of flanges 32 and 32' extending outwardly from the mold body adjacent the opening, another flange 34 extending outwardly from the filling chamber and contoured to abut the flanges 32 and 32', and a clasp having two segments 36 and 36' operable to overlap and hold the flanges in abutment. A latch bolt 37 releasably holds the clasp segments together. Alignment is assured between the filling chamber and the mold body by use of dowel pins 38 which fit into holes 40 in flanges 32 and 32'.

The components of mold body 22 are shown best in FIG. 4. They include first and second sidewall sections 42 and 44, end plate 46 and end plug 48. The sidewall sections are releasably held together by the provision of flanges 50, 50', 52 and 52' extending outwardly from the inner and outer circumferences of the sidewall sections, the flanges being clampable in abutment by inner clasp 54 and outer clasp 56.

Similarly end plate 46 is held in abutment with sidewall sections 42 and 44 by the provision of end flanges 58 and 58' on the mold body, and end clasps 60 and 60' overlapping the end flanges and the end plate. The various components are aligned by a plurality of dowel pins 62 which fit into corresponding holes 64 in the flanges.

Clasps 54, 56, 60 and 60' are releasably held in locked position over the flanges by the provision of locking pins 65 which extend through holes 67 in the flanges and clasps.

As shown in FIG. 3, a press block 66 is insertable into filling chamber 20. It is configured and dimensioned similarly to the cross section of the inside of the filling chamber and is operable to move slidably therethrough. The press block is further insertable into the top of mold body 22 until it is flush with flanges 32 and 32'.

As best shown in FIGS. 3 and 7, flanges 32 and 32' at the top of mold body 22 each mount an opposed upright ear 68. Each ear has a slot therein even with the top of the flange for receiving a retaining bar 70. The flange 34 on the filling chamber has a transverse notch 72 and clasps 36 and 36' have slots at 73 to permit passage of the retaining bar when the mold body is attached to the filling chamber. The retaining bar operates to hold press block 66 in the mold body.

As shown in FIGS. 3 and 8 a loading chute 74 is attachable to the top of filling chamber 20 to receive particulate material from a bucket 76 and guide the material into the filling chamber. The chute is then removable from its operative position.

Frame 24 mounts a hydraulic cylinder 78 above filling chamber 20. A piston rod 80 extends downwardly from the cylinder and mounts a saddle block 82. The saddle block is operable to exert pressure against press block 66 and thus compress the contents of the filling chamber and mold.

The tire filler segment formed in mold body 22 is shown generally at 84 in FIGS. 1 and 2. It has the configuration of the cavity in the mold body, having a substantially arcuate contour as previously related.

As shown in FIGS. 11 and 12, in the assembled composite solid tire, a plurality of segments 84 are arranged in a tire casing 86. The width of the segments varies radially and is substantially similar to the inside of the tire casing. However, for the average size tire, the maximum width of the segments is preferably about two inches wider than the width of the relaxed tire casing. Also, the inner circumference of the segments is slightly larger than the inner circumference of the casing. Since the casing inherently is resiliently deformable, this allows it to assume the proper configuration and maintain a snug fit as the tire carries a load.

While the end faces of each segment 84 are preferably planar, various configurations could be used as long as each segment fits against the next. Also the end faces are preferably not perpendicular to the circumference of the segments, but are rather substantially tangent to the inner circumference of the arcuate contour (FIG. 12). This is to insure that the abutting face surfaces of each pair of segments will not form a joint in a plane substantially perpendicular to the point of contact with the ground. As a consequence, the faces will overlie each other so that one face bears against the meeting face. This forms a unitary whole and prevents the individual segments from working out of place and distorting the casing in which they are contained.

A further utility of having the end faces of segments 84 at a non-perpendicular angle to the arcuate contour is evident in FIG. 12 where the insertion of the last segment is illustrated. A block 88 is operable to apply a slight force to one end face of the last segment to be inserted, and the segment, with little abnormal deformation of itself or casing 86 is moveable in the direction of the arrows.

FIG. 13 illustrates a section through the composite vehicle tire of our invention. Casing 86 with segments 84 inside is mounted on a wheel 90. The wheel is preferably of the split-rim type, having bolts as shown at 92 fastening the wheel halves together. Once the tire is mounted, there are essentially no open spaces in the tire; the side walls of the tire conform to the shape of the filler segments.

OPERATION

The manner of operation of our invention for forming molded products is illustrated in FIGS. 8, 9 and 10.

The inside surfaces of mold body 22 are first coated with a light grease to aid in release of the product from the mold. Then the mold body is assembled by fastening the various components together with clasps 54, 56, 60 and 60'.

The assembled mold body 22 is then attached to filling chamber 20. This is accomplished by abutting flanges 32 and 32' on the mold body against flange 34 on the filling chamber. Positive alignment is assured by the insertion of dowel pins 38 which fit into holes 40 in the flanges on the mold body. Clasps 36 and 36' are then closed over the flanges and fastened by latch bolt 37.

Loading chute 74 is then placed over the top of filling chamber 20. A measured quantity of rubber pieces of the desired size and characteristics is formed and introduced into the filling chamber from, for example, bucket 76. The loading chute is then removed from the filling chamber.

Press block 66 is then inserted into the top of filling chamber 20 and cylinder 78 extends piston rod 80 until saddle block 82 comes in contact with the press block. Uniform pressure is then exerted on the particulate material in the filling chamber and mold body 22, pressing the material into the mold.

While the particulate material is being compressed, it should be noted, the material is of a sufficiently cohesive nature that it does not come out through notch 72 and slots 73.

Pressing is continued until press block 66 is pressed into the opening in mold body 22, flush with the top of flanges 32 and 32'. The material in the mold body is thus compacted to density of from 15 to 75 pounds per cubic foot, and is at a pressure of from 500 to 4,000, preferably 1,000 to 3,000 psi.

The mold is then closed or sealed. This is accomplished by inserting retaining bar 70 through ears 68 and slots 73. Clasps 36 and 36' may then be released and opened, separating mold body 22 from filling chamber 20.

Mold body 22 containing the compressed particulate material next is placed in an oven (not shown) and the mold and its contents are heated. A temperature of from 100° to 600° F., preferably 350° to 450° F. is maintained for a time sufficient to bring the central portion of the mold contents to a temperature of from 200° to 300° F. Under these conditions the individual pieces within the mold consolidate and bond to each other, either by sintering together or through chemical reaction. This may be accomplished without the use of a solvent, bonding or vulcanizing agent.

At the conclusion of the heat and pressure treatment, the mold and its contents are cooled, the mold opened and the finished tire filler segment 84 removed.

To assemble the composite tire, as shown in FIGS. 11 and 12, several segments 84 are placed into a suitable tire casing 86, which may be a discarded or used casing, or a retreaded tire. The last segment to be inserted into the casing must be pressed into place, however, only slightly deforming the other segments in the process. Because of the unique shape of the segments this insertion is possible.

For such insertion, tire casing 86 must be held, and the other segments 84 held in position. Then a downward and inward pressure is applied by block 88 forcing the last segment into place. Little abnormal stretching or warping of the casing is required in the insertion. Since the segments are preferably slightly wider than the relaxed casing, the casing fits snugly around the segments.

Tire casing 86 with the enclosed segments 84 is then mounted on a wheel 90 as shown in FIG. 13. The wheel is preferably of the split-rim type. Bolts such as shown at 92 are fastened to hold the assembly together.

EXAMPLE

To make a rubber tire filler segment for use in a composite industrial truck tire, the following procedure is illustrative.

A mixture of 25% of up to ¼" mesh rubber particles and 75% of up to 3×3 inch rubber chips is prepared.

The resulting mixture is placed in a mold of arcuate contour representing ¼ of the circumference of the finished tire. The material is compressed in the mold to a density of 45 pounds per cubic foot. This requires a pressure of about 2,000 pounds per square inch.

The mold and its contained charge is placed in an oven and heated at 380°–400° F. until the material in the interior of the mold charge has attained a curing temperature of 230°–280° F. The cure time is approximately 4 hours.

The mold and contents are cooled to ambient temperature, the mold opened and the consolidated tire filler segment removed.

Four such segments then are inserted in an appropriately sized tire casing, which is mounted on a rim to produce the finished composite tire.

It can be seen from the foregoing description that our invention provides a useful mold for producing consolidated articles such as tire filler segments for composite tires used in industrial applications. The filler segments are sturdy and have a long service life. Under normal use they may outlast a tire casing, whereupon they may be removed and placed in a new casing. Punctures and other abuses are readily tolerated, and considerable equipment down time is eliminated. The invention makes use of waste and waste byproducts, thus conserving rubber and petroleum supplies and providing a relatively low-cost product.

Furthermore, the technology of our invention may be applied to advantage in the manufacture of a diversity of consolidated rubber products, including walkways or roadways, railroad crossings, and sheet products such as industrial mats.

What we claim and desire to secure by Letters Patent is:

1. A composite vehicle tire comprising a tire casing and within the casing four substantially identical filler segments arranged end to end, each segment comprising a mass heat and pressure-consolidated from resilient particulate rubber material and having an arcuate contour and a cross section substantially similar to the cross section of the inside of the casing but larger by an increment predetermined for a pressure fit, the opposite end faces of each segment being substantially planar and disposed in intersecting planes which extend substantially perpendicular to each other and substantially tangent to the inner circumference of the arcuate contour.

* * * * *